(12) United States Patent
Ligeti

(10) Patent No.: US 9,189,838 B2
(45) Date of Patent: Nov. 17, 2015

(54) METHOD AND APPARATUS FOR IMAGE PROCESSING

(71) Applicant: COMAGNA KFT, Budapest (HU)

(72) Inventor: Gabor Ligeti, Budapest (HU)

(73) Assignee: COMAGNA KFT, Budapest (HU)

( * ) Notice: Subject to any disclaimer, the term of this patent is extended or adjusted under 35 U.S.C. 154(b) by 10 days.

(21) Appl. No.: 13/863,161

(22) Filed: Apr. 15, 2013

(65) Prior Publication Data

US 2013/0222689 A1 Aug. 29, 2013

Related U.S. Application Data

(62) Division of application No. 12/107,978, filed on Apr. 23, 2008, now Pat. No. 8,422,767.

(60) Provisional application No. 60/913,493, filed on Apr. 23, 2007.

(51) Int. Cl.
| | |
|---|---|
| G06K 9/62 | (2006.01) |
| G06T 5/50 | (2006.01) |
| G06T 5/00 | (2006.01) |
| H04N 7/01 | (2006.01) |

(52) U.S. Cl.
CPC ... *G06T 5/50* (2013.01); *G06T 5/00* (2013.01); *H04N 7/0125* (2013.01)

(58) Field of Classification Search
CPC .................................... G06T 5/00; G06T 5/50
USPC ................................................. 382/155–156
See application file for complete search history.

(56) References Cited

U.S. PATENT DOCUMENTS

| | | | | |
|---|---|---|---|---|
| 4,217,641 A | * | 8/1980 | Naparstek | 382/131 |
| 4,831,528 A | * | 5/1989 | Crawford et al. | 382/131 |
| 5,262,979 A | * | 11/1993 | Chao | 365/49.1 |
| 5,502,793 A | * | 3/1996 | Ng | 358/1.9 |
| 5,629,734 A | * | 5/1997 | Hamilton et al. | 348/222.1 |
| 5,872,859 A | * | 2/1999 | Gur et al. | 382/128 |
| 6,021,256 A | * | 2/2000 | Ng et al. | 358/1.9 |
| 6,133,957 A | * | 10/2000 | Campbell | 348/458 |
| 6,259,823 B1 | * | 7/2001 | Lee et al. | 382/268 |
| 6,278,793 B1 | * | 8/2001 | Gur et al. | 382/128 |
| 6,320,976 B1 | * | 11/2001 | Murthy et al. | 382/128 |
| 6,421,468 B1 | * | 7/2002 | Ratnakar et al. | 382/254 |
| 6,526,156 B1 | * | 2/2003 | Black et al. | 382/103 |
| 6,580,936 B2 | * | 6/2003 | Muraki et al. | 600/410 |
| 6,970,597 B1 | * | 11/2005 | Olding et al. | 382/167 |
| 7,375,767 B2 | * | 5/2008 | Lee et al. | 348/581 |
| 7,379,626 B2 | * | 5/2008 | Lachine et al. | 382/300 |

(Continued)

OTHER PUBLICATIONS

Do, et al., "Volterra-type nonlinear image restoration of medical imagery using principal dynamic modes", ITTT Int'l Symposium on Biomedical Imaging: Macro to Nano; USA, Apr. 15, 2004, pp. 760-763.

(Continued)

*Primary Examiner* — Gandhi Thirugnanam
(74) *Attorney, Agent, or Firm* — Michael A. Glenn; Perkins Coie LLP

(57) ABSTRACT

The present invention discloses a system and method of transforming a sample of content data by utilizing known samples in a learning phase to best determine coefficients for a linear combination of non-linear filter functions and applying the coefficients to the content data in an operational phase.

5 Claims, 5 Drawing Sheets

(56) References Cited

U.S. PATENT DOCUMENTS

| | | | |
|---|---|---|---|
| 8,147,503 B2 * | 4/2012 | Zhao et al. | 606/130 |
| 8,422,767 B2 * | 4/2013 | Ligeti | 382/156 |
| 2002/0146178 A1 * | 10/2002 | Bolle et al. | 382/254 |
| 2002/0159642 A1 * | 10/2002 | Whitney | 382/225 |
| 2002/0172434 A1 * | 11/2002 | Freeman et al. | 382/299 |
| 2002/0186893 A1 * | 12/2002 | Marmarelis | 382/260 |
| 2003/0112874 A1 * | 6/2003 | Rabinowitz et al. | 375/240.21 |
| 2003/0161518 A1 * | 8/2003 | Vuylsteke | 382/128 |
| 2004/0081370 A1 * | 4/2004 | Murphy | 382/286 |
| 2004/0126008 A1 * | 7/2004 | Chapoulaud et al. | 382/156 |
| 2005/0134731 A1 * | 6/2005 | Lee et al. | 348/458 |
| 2008/0062287 A1 * | 3/2008 | Agrawal et al. | 348/241 |
| 2008/0260285 A1 * | 10/2008 | Ligeti | 382/276 |
| 2008/0279434 A1 * | 11/2008 | Cassill | 382/131 |
| 2011/0170751 A1 * | 7/2011 | Mangoubi et al. | 382/128 |
| 2013/0222689 A1 * | 8/2013 | Ligeti | 348/441 |

OTHER PUBLICATIONS

Hu, et al., "Classification-based hybrid filters for image processing", Proc. of the Int'l Society for Optical Engineering; vol. 6077; USA, Jan. 18, 2006, 10 pages.

Li, Xin et al., "New Edge-Directed Interpolation", IEEE Transactions on Image Processing, vol. 19, No. 10, Oct. 2001.

* cited by examiner

METHOD AND APPARATUS FOR IMAGE PROCESSING

CROSS REFERENCE TO RELATED APPLICATIONS

This patent application is a divisional of copending U.S. patent application Ser. No. 12/107,978, filed Apr. 23, 2008, which claims priority under 35 U.S.C. §119 from U.S. provisional patent application No. 60/913,493 filed Apr. 23, 2007 entitled "METHOD AND APPARATUS FOR IMAGE PROCESSING" which are hereby incorporated by reference in their entirety.

BACKGROUND OF THE INVENTION

1. Technical Field

The invention relates to signal processing methods, particularly to calculating values from correlated sample values (such as a neighborhood) in signal enhancement applications.

2. Background

It is a common goal in signal processing to attempt to enhance the quality of given content. Some methods exist to achieve better results than simple linear convolution filters and interpolation methods such as bi-linear filters, tri-linear filters, bi-cubic filters, tri-cubic filters, Laplace filters and Lanczos filters. Another method includes "classifying" the neighborhood using different methods (gradient, pattern matching, clustering, edge detection, optical flow) and select specific convolution filters, or combine convolution filters based on that classification, such as the method described in U.S. Pat. No. 6,133,957. Still another method attempts to calculate appropriate values based on coarser-scale characteristics of the dataset. Some methods then take a least square approach to determine the convolution coefficients for each "class" of neighborhood. In effect, all these methods are defining non-linear filter functions of the neighborhood with some heuristic approach. Most known methods suffer from computational complexity while others suffer from artifacts and mediocre image quality.

SUMMARY OF THE DISCLOSURE

The present invention discloses a system and method of transforming a sample of content data by utilizing known samples in a learning phase to best determine coefficients for a linear combination of non-linear filter functions and applying the coefficients to content data in an operational phase.

In some embodiments of the present invention, the known samples are down-sampled in the learning phase to derive target content used with a transform to determine optimal the coefficients. According to these embodiments, the down-sampled content at least partially resembles the content data.

In some embodiments of the present invention, a pre-selected set of filter functions are used in a combination with a corresponding set of weighting coefficients. According to these embodiments, the derived coefficients values reflect the expected symmetries and/or dependencies of the filter functions.

In some embodiments of the present invention, the content data is obtained from capture devices such as digital still cameras or digital video cameras. In some embodiments of the present invention, the content data is streaming video data. According to these embodiments, low-quality video content (e.g. 480i television content) is able to be transformed into high-quality television content (e.g. 1080p television content). In some other embodiments, the content data is medical imaging data such as MRI or CT data.

In some embodiments of the present invention, an apparatus is used to accept content data, perform the appropriate learning phase processing and operational phase processing and output transformed content data.

In some embodiments of the present invention, optional steps of pre-emphasis, de-emphasis, memory storage, compression and decompression, and de-aliasing are performed.

DETAILED DESCRIPTION

Those of ordinary skill in the art will realize that the following detailed description of the present invention is illustrative only and is not intended to limit the claimed invention. Other embodiments of the present invention will readily suggest themselves to such skilled persons having the benefit of this disclosure. It will be appreciated that in the development of any such actual implementation, numerous implementation-specific decisions must be made in order to achieve the developer's specific goals. Reference will now be made in detail to implementations of the present invention as illustrated in the accompanying drawings. The same reference indicators will be used throughout the drawings and the following detailed description to refer to the same or like parts.

Given a class of discrete signals (such as a captured sample or generated values) that has strong correlations among a small number of related samples (such as an abstract "neighborhood"; for example spatially or temporally correlated in one or multiple dimensions in an array), and the need for a filter operator that is a function of said neighborhood samples plus optionally some more variables, it is desirable to transform the discreet signals using one or more optimized filter functions.

In accordance with the present invention, a system and method of content transformation is disclosed by defining optimal coefficients in a learning phase and applying the coefficients to a new sample in an operational phase.

Overview

Figure 1:
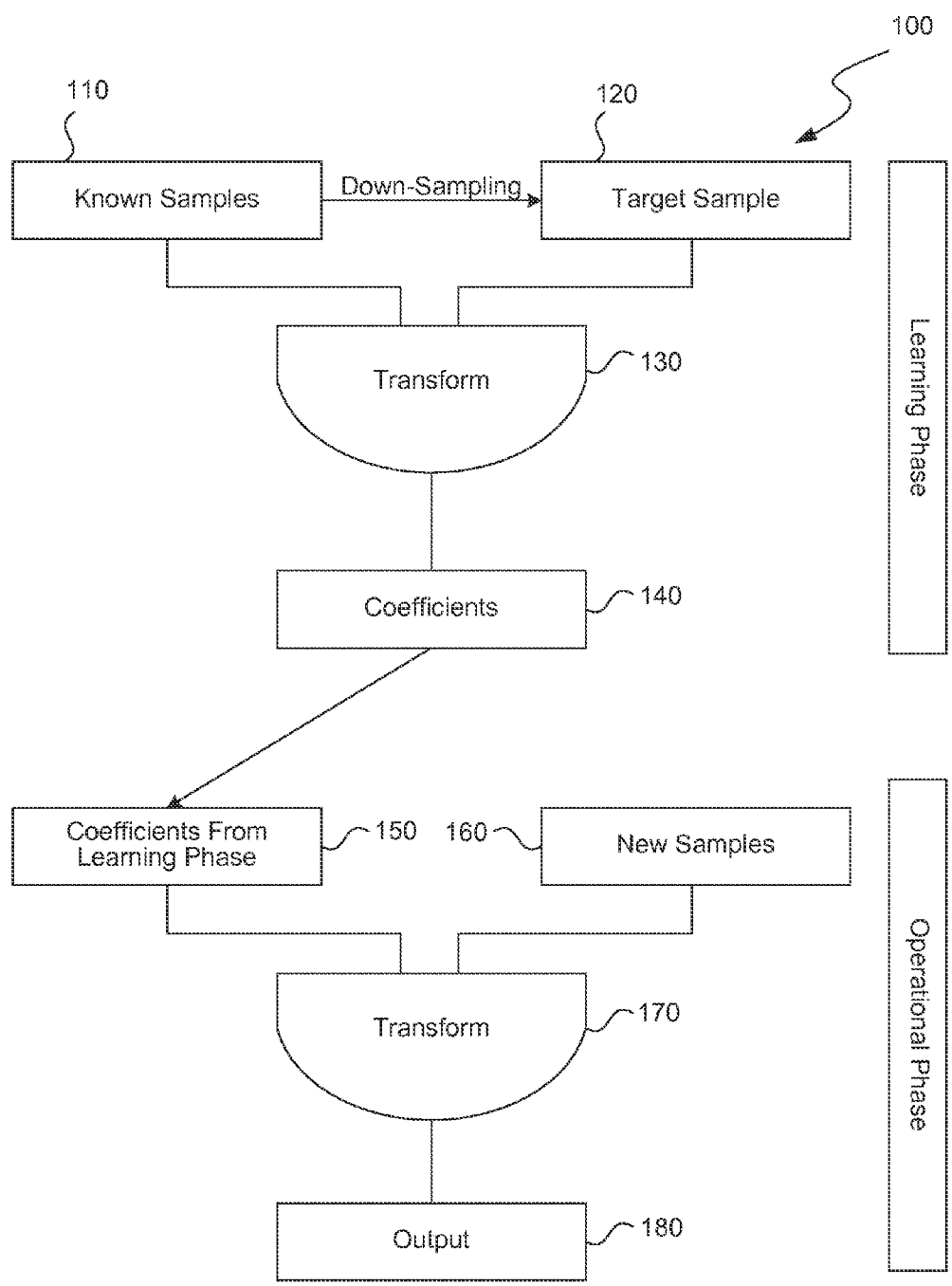
FIG. 1 illustrates a process of defining optimal coefficients in a learning phase and applying the coefficients to a new sample in an operational phase according to the present invention.

FIG. 1 illustrates a process 100 of defining optimal coefficients in a learning phase and applying the coefficients to a new sample in an operational phase according to the present invention. In the learning phase, a known sample 110 is provided representing a desired output for the system. The known sample is then down-sampled to produce a target sample 120. The target sample 120 is so-called because it is the target of a transformation to determine what coefficients best reconstructs the known sample. A transformation function ("transform") 130 is provided that accepts the known sample 110 values and target sample 120 values. In some embodiments of the present invention, the sample values correlate to neighborhood of pixels in an array. In the preferred embodiment of the present invention, the transform 130 is a linear combination set of pre-selected non-linear functions.

The transform 130 is solved using the known samples 110 and the target sample 120, yielding a set of coefficients 140. The returned coefficients 140 are the best coefficients to reconstruct the known sample 110 from the target sample 120.

In an operational phase, the coefficients obtained from the learning phase 150 are applied to a transform 170 along with new samples 160. The transform 170 is the same transform studied in the learning phase. Therefore, the output 180 is transformed to be representative of the original known samples 110.

In some embodiments of the present invention, discrete samples of digital images, recorded digital video signals, interlaced analog television signals, etc. comprise the new samples 160 that are transformed. According to these embodiments, high-quality known samples of digital images, digital video signals, deinterlaced digital television signals, etc. are used in the training phase. Preferably the known samples 110 are of a very high quality such that when they are subsequently down-sampled, the resulting target samples will emulate the new signals. It will be readily apparent to those having ordinary skill in the art that although specific examples are given for the new samples 160 and known samples 110, the present invention is equally applicable to all appropriate transformable content, now known or later developed.

In some embodiments of the present invention, a step of determining the appropriate transform 130 to perform is done manually. In other embodiments, the appropriate transform 130 is known. In the preferred embodiment, the transform 130 is a linear combination of pre-selected non-linear functions. The most common examples of such filter functions are interpolations (with added parameters defining the relative position of the continuous point within the pixel), convolutions that are linear functions of said neighborhood samples, or filters such as noise reduction, edge enhancement, sharpening, etc. There exists other non-linear filter functions also commonly used, such as Xin-Li method for resolution enhancement, combinations of convolutions weighed by gradients. Although specific filter functions are disclosed, it will be readily apparent to those having ordinary skill in the art that any useful filter function, now known or later developed, may be used for image enhancement according to the present invention.

Exemplary Embodiment

In exemplary embodiments of the present invention, the set of filter functions is a set of pre-selected (not necessarily linear) primary functions of the neighborhood (and optionally additional parameters). According to these embodiments, the class of functions may be defined by the possible linear combinations of these pre-selected functions with arbitrary weights or coefficients, such as $$y = \sum_{i=1}^{N} a_i f_i(s_0, s_1 s_2, \ldots, s_n, p_1, \ldots, p_m) \quad (1)$$

or in short, $$y = \sum_{i=1}^{N} a_i f_i(\underline{s}, \underline{p}) \quad (2)$$

where $s_i$ ($1 \leq i \leq n$) are the discrete values of a given neighborhood of $s_0$ and $\underline{p} = p_1, p_2, \ldots, p_m$ are optional additional parameters, and $f_i(\underline{s}, \underline{p})$ ($1 \leq i \leq N$) are the pre-selected primary filter functions. Each specific set of $a_i$ coefficients define a specific filter function within this class.

In some embodiments, the optional parameters, $\underline{p} = p_1, p_2, \ldots, p_m$ create an f(x,y) or f(x,y,z) function that would best approximate the continuous original source within the sample where z may is a third dimension value in space or time. In some embodiments, the optional parameters allow a single filter to be trained to perform arbitrary scaling/upscaling/zooming even to non-integer factors, or changing the frame rate (if the z denotes the time scale in case of a video signal) arbitrarily by a single filter.

The training set is a large set of samples along with their respective known desired y values that we wish to approximate with a filter function. The system can then take the training set in the training phase, and find the coefficients such that the difference of the desired y values and the value of the $F(\underline{s}, \underline{p})$ is the smallest in some metrics; and then use the filter defined by those coefficients in the operational phase. There are many options including iterative, Gauss, neural network and other methods to accomplish this.

One preferred method described below is regression, that can find the best coefficients for the above defined class of filter functions so that the specific function within that class defined by those coefficients will best approximate the a-priori desired values of the said sample in "mean square error" or PSNR (peak signal to noise ratio) terms.

According to this exemplary embodiment, for a given training set, consisting of a large set of $s_0^j$ and corresponding $s_i^j$ ($1 \leq j \leq M$) ($1 \leq i \leq n$) and $\underline{p}^j$ parameter values with desired $y^j$ values we want to determine the best possible $a_i$ coefficients.

With the notation $s'^j_i = f_i(s_0^j, s_1^j, s_2^j, \ldots, s_n^j, \underline{p}^j)$ ($1 \leq i \leq N$) one possible method is to create the matrix $$S = \begin{bmatrix} s'^1_1 & s'^1_2 & \ldots & s'^1_N \\ s'^2_1 & s'^2_2 & \ldots & s'^2_N \\ \ldots & \ldots & \ldots & \ldots \\ s'^M_1 & s'^M_2 & \ldots & s'^M_N \end{bmatrix} \text{ and the vector } \underline{y} = \begin{bmatrix} y^1 \\ y^2 \\ \ldots \\ y^M \end{bmatrix}$$

with the unknown coefficients being $$\underline{a} = \begin{bmatrix} a_1 \\ a_2 \\ \ldots \\ a_N \end{bmatrix}$$

and then the problem can be formulated as solving the system of linear equations $$\begin{bmatrix} s_1'^1 & s_2'^1 & \ldots & s_N'^1 \\ s_1'^2 & s_2'^2 & \ldots & s_N'^2 \\ \ldots & \ldots & \ldots & \ldots \\ s_1'^M & s_2'^M & \ldots & s_N'^M \end{bmatrix} \begin{bmatrix} a_1 \\ a_2 \\ \ldots \\ a_N \end{bmatrix} = \begin{bmatrix} y^1 \\ y^2 \\ \ldots \\ y^M \end{bmatrix} \quad (3)$$

or in short, $$S\underline{a} = \underline{y}$$

With M>N this system of linear equations is overdetermined, but we can find the solution where the length of $S\underline{a}-\underline{y}$ is minimal, which is equivalent of minimizing the mean square error. Also, $S\underline{a}-\underline{y}$ is minimal if and only if it is perpendicular to the N dimensional subspace of the M dimensional Euclidean space defined by S.

One possible solution based on these considerations is given by the Moore-Penrose pseudo-inverse, the best x in those terms can be obtained by $$S^T(S\underline{a}-\underline{y})=0$$

$$S^TS\underline{a}=S^T\underline{y} \quad (4)$$

$$\underline{a}=(S^TS)^{-1}S^T\underline{y}$$

While creating the large N×M matrix is computationally too complex with the desired large training set of samples, we can dynamically maintain the N×N matrix $S^TS$ and the N dimensional vector $S^T\underline{y}$ in the learning phase by starting with a nullmatrix and nullvector respectively and for each sample in the training set adding the diadmatrix $\underline{s}^{j^T}\underline{s}^{j}$ to $S^TS$ and add $\underline{s}^{j^T}y^j$ to $S^T\underline{y}$ where (1≤j≤M). After the learning phase, we can calculate a vector (that is the coefficients) from the Moore-Penrose formula, and use them in the operational phase. If the $S^TS$ matrix has no inverse, that is the system of linear equations is underdetermined, we can still find one of the infinite solutions of the equation $S^TS\underline{a}=S^T\underline{y}$.

When multiple filters are required for some image processing application (such as color demosaicing (one for each color plane), or resolution enhancement (one per subpixel), or when processing color images) two possible options are available. In one embodiment of this invention, each of the I filters can be treated individually and independently. In another embodiment of the invention, a single filter can be used that takes I*(n+1) samples with the following notation:

$$F_1(s_0, s_1, \ldots, s_n) = F\left(s_0, s_1, \ldots, s_n, \overset{n+1}{0}, \overset{n+2}{0}, \ldots, \overset{I^*(n+1)-1}{0}\right)$$

$$F_2(s_0, s_1, \ldots, s_n) = F\left(\overset{0}{0}, \overset{1}{0}, \ldots, \overset{n}{0}, s_0, s_1, \ldots, s_n, \overset{2n+2}{0}, \ldots, \overset{I^*(n+1)-1}{0}\right)$$

...

$$F_I(s_0, s_1, \ldots, s_n) = F\left(\overset{0}{0}, \overset{1}{0}, \ldots, \overset{(I-1)(n+1)-1}{0}, s_0, s_1, \ldots, s_n\right)$$

The advantage of this method is that expected symmetries or codependencies of the different $F_i$ functions can be coded into the coefficients by selecting the f functions reflecting the expected symmetries or dependencies. Or, in general, if the $\underline{a}$ coefficients have a number of symmetry and other properties (for example that the sum of the subpixels should be equal to $s_0$), that can be formulated in L linear equations such as $$C\underline{a}=\underline{b}$$

where L<N, the formula can be solved as $$C' = \begin{bmatrix} 1 & 0 & \ldots & 0 \\ 0 & 1 & & 0 \\ \ldots & & & 0 \\ 0 & \ldots & & 0 \\ c_{1,1} & c_{1,2} & \ldots & c_{1,N} \\ \ldots & & & \\ c_{L,1} & c_{L,2} & \ldots & c_{L,N} \end{bmatrix} \text{ (size: } N \times N\text{)}$$

$$\underline{b}' = \begin{bmatrix} 0 \\ 0 \\ \ldots \\ 0 \\ b_1 \\ \ldots \\ b_L \end{bmatrix} \text{ (size: } N\text{)}$$

$$E = \begin{bmatrix} 1 & 0 & \ldots & 0 \\ 0 & 1 & & 0 \\ \ldots & & & 0 \\ 0 & \ldots & & 1 \\ 0 & 0 & \ldots & 0 \\ \ldots & & & \\ 0 & 0 & \ldots & 0 \end{bmatrix} \text{ (size: } N - L \times N\text{) and}$$

$$\underline{a}' = \begin{bmatrix} a_1 \\ a_2 \\ \ldots \\ a_{N-L} \end{bmatrix} (N - L)$$

$$C'\underline{a} = E\underline{a}' + \underline{b}'$$

$$\underline{a} = C'^{-1}E\underline{a}' + C'^{-1}\underline{b}'$$

from which the original equation (3) is rewritten as $$S\underline{a}=\underline{y}$$

$$S(C'^{-1}E\underline{a}'+C'^{-1}\underline{b}')=\underline{y}$$

$$SC'^{-1}E\underline{a}'=\underline{y}-C'^{-1}\underline{b}'$$

with, $S'=SC'^{-1}E$ and $\underline{y}'=\underline{y}-C'^{-1}\underline{b}'$ substitutions yield the $S'\underline{a}'=\underline{y}'$ overdetermined set of equations with S' being L×M in size which can be then solved as (3).

Most existing solutions using non-linear filters can be regarded as a specific case of the above class of F filter functions. For example, those that classify the signal based on the neighborhood (usually using a gradient filter) can be regarded as selecting a set of $f_{i,j}(\underline{s})=f'_j(\underline{s})s_i$ functions yielding $$y = \sum_j f'_j(\underline{s})(a_{0,j}s_0 + a_{1,j}s_1 + \ldots + a_{n,j}s_n) \quad (5)$$

$$y = \sum_j \left(f'_j(\underline{s})\sum_i a_{i,j}s_i\right)$$

such that for each $\underline{s}$ exactly one of the $f'_j(\underline{s})$ functions are 1, and the other ones are 0. The problem with those methods is that the resulting F function is not continuous, causing artifacts when a large area of samples of one class borders with another area of another class. To address continuity, in some variations, $f'_j(\underline{s})$ are not 1 or 0, but denote the "confidence" factor of $s_0$ and its neighborhood belonging to a specific class. The advantage of these methods is that only a relatively small number of non-linear f functions need to be computed for each sample neighborhood.

One consideration is that in the majority of the applications the filter function is expected to have the following invariance property (homogeneity):

$$F(\alpha s_0+\beta, \alpha s_1+\beta, \ldots, \alpha s_n+\beta, p_1, \ldots, p_m) = \alpha F(s_0, s_1, \ldots, s_n, p_1, \ldots, p_m) + \beta \quad (6)$$

It is easy to see that this can be accomplished with (5) only if it can be rewritten as follows:

$$y = s_0 + \sum_j \left( f''_j(\underline{s}) \sum_i a_{i,j}(s_i - s_0) \right) \quad (7)$$

where each f'' function has the following property:

$$f''(\alpha s_0+\beta, \alpha s_1+\beta, \ldots, \alpha s_n+\beta) = f''(s_0, s_1, \ldots, s_n) \quad (8)$$

One approach therefore is to select f functions with such properties. Heuristic approaches such as gradient based methods or classifications comply with this constraint.

The concern remains if (7) may limit how well the ideal F function with the constraint of (6) can be approximated.

To address that concern, let's suppose we have a d "norm" function with the following property: $d(\alpha\underline{s}) = |\alpha| d(\underline{s})$—examples of such functions include the norm functions $d(\underline{s}) = \sqrt{\sum s_i^2}$ or in general, $$d(\underline{s}) = \sqrt[k]{c_i \sum s_i^k}$$

or $d(\underline{s}) = \max(c_i|s_i|)$

It is easy to prove that (6) is true for a continuous F only if F can be rewritten as follows:

$$F(s_0, s_1, \ldots, s_n, p_1, \ldots, p_m) = \begin{cases} s_0 \mid \forall i : s_i = s_0 \\ s_0 + d'(\underline{s}) F'\left(\frac{s_1 - s_0}{d'(\underline{s})}, \frac{s_2 - s_0}{d'(\underline{s})}, \ldots, \frac{s_n - s_0}{d'(\underline{s})}, p_1, \ldots, p_m\right) \mid \text{otherwise} \end{cases}$$

where $d'(\underline{s}) = d(s_1-s_0, s_2-s_0, \ldots, s_n-s_0)$ and F' is an odd function for the s variables such that $F'(s_0, s_1, \ldots, s_n, p_1, \ldots, p_m) = -F'(-s_0, -s_1, \ldots, -s_n, p_1, \ldots, p_m)$.

As the most generic approach, F' can be well approximated with polynomials. As F' should be odd, it should only include the monomials of odd orders, so with the specific choice of $d'(\underline{s}) = \sqrt{\sum(s_1-s_0)^2}F$ it can be expressed as:

$$F(s_0, s_1, \ldots, s_n) = s_0 + \sum a_i(s_i - s_0) +$$
$$\sum a_{i,j,k} \frac{(s_i - s_0)(s_j - s_0)(s_k - s_0)}{\sum(s_i - s_0)^2} + \ldots$$
$$= s_0 + \sum a_i(s_i - s_0) +$$
$$\sum_{j,k} \frac{(s_j - s_0)(s_k - s_0)}{\sum(s_i - s_0)^2} \left( \sum_i a_{i,j,k}(s_i - s_0) \right) + \ldots$$

which is exactly (7) with the special choice of f functions:

$$f'_0(\underline{s}) = 1, \, f'_{j,k}(\underline{s})$$
$$= \frac{(s_j - s_0)(s_k - s_0)}{\sum(s_i - s_0)^2},$$
$$f'_{j,k,l,m}(\underline{s}) = \frac{(s_j - s_0)(s_k - s_0)(s_l - s_0)(s_m - s_0)}{\sum(s_i - s_0)^2}, \ldots$$

This proves that filters in the form of (7) can approximate the ideal F function arbitrarily well.

However, this formula is still too generic, yielding too many coefficients and respective monomials even at order 3. One pruning option is to consider approximation only until order 1 monomials which yields the class of well known convolutions. A natural extension of linear convolutions therefore is selecting all, or selected monomials for j, k gives us f' functions $$f_{j,k}(\underline{s}) = \frac{(s_j - s_0)(s_k - s_0)}{\sum(s_i - s_0)^2}$$

Note that the fact that the norm function needs to be calculated only once per sample and neighborhood and is reused in each f primary function further reduces computational complexity.

Other good choices for the f' functions at order 3 approximations after these considerations (using other reformulations or different norm functions) are $$\frac{\sum c_{ij}|s_i - s_j|^k}{\sum c_i|s_i - s_0|^k} \text{ or } \frac{\sum c_{ij}|s_i - s_j|^k}{\max(c_i|s_i - s_0|^k)} \text{ for some } k \in N \quad (9)$$

Let's notice that specific choices of i, j pairs will generate functions that will in a sense measure "directions" in arrays; such as where the corresponding samples line up in some direction in the neighborhood of $s_0$. However, instead of heuristics used in earlier methods, this apparatus can take a statistical approach and simply identify the best such monomials and the best linear combinations thereof from pure mathematical and statistical considerations without making those a-priori assumptions about directions and gradients; therefore it is not limited to image processing.

The norm function may vary depending on the type of the correlation of the neighborhood. When the signal is a color array or a color mosaic, there are different approaches:
 a) treat each color channel as separate problems
 b) treat each color channel as the third (fourth) dimension in the neighborhood
 c) treat the problem as each s is a vector rather than a scalar value Approach a) is a good approach although it may not be able to exploit certain correlations among the color channels. b) and c) are formally different, but technically very similar; the choice of a good "norm" function is key. Consider $\underline{s}_i = (s_i^r, s_i^g,$ $s_i^b$) in the case of a color array. One good approach may be to consider norms adapted to the correlations such as $$d''^r(\underline{s}) = \sqrt[k]{c_i^{r,r}\sum(s_i^r - s_0^r)^k + c_i^{r,g}\sum(s_i^g - s_0^g)^k + c_i^{r,b}\sum(s_i^b - s_0^b)^k}$$

and in general only subtract sample values belonging to the same channel in (9). Similar considerations should be used with other type of correlations, such as a color mosaic obtained by a Bayer filter.

Illustrative Example

Figure 2:
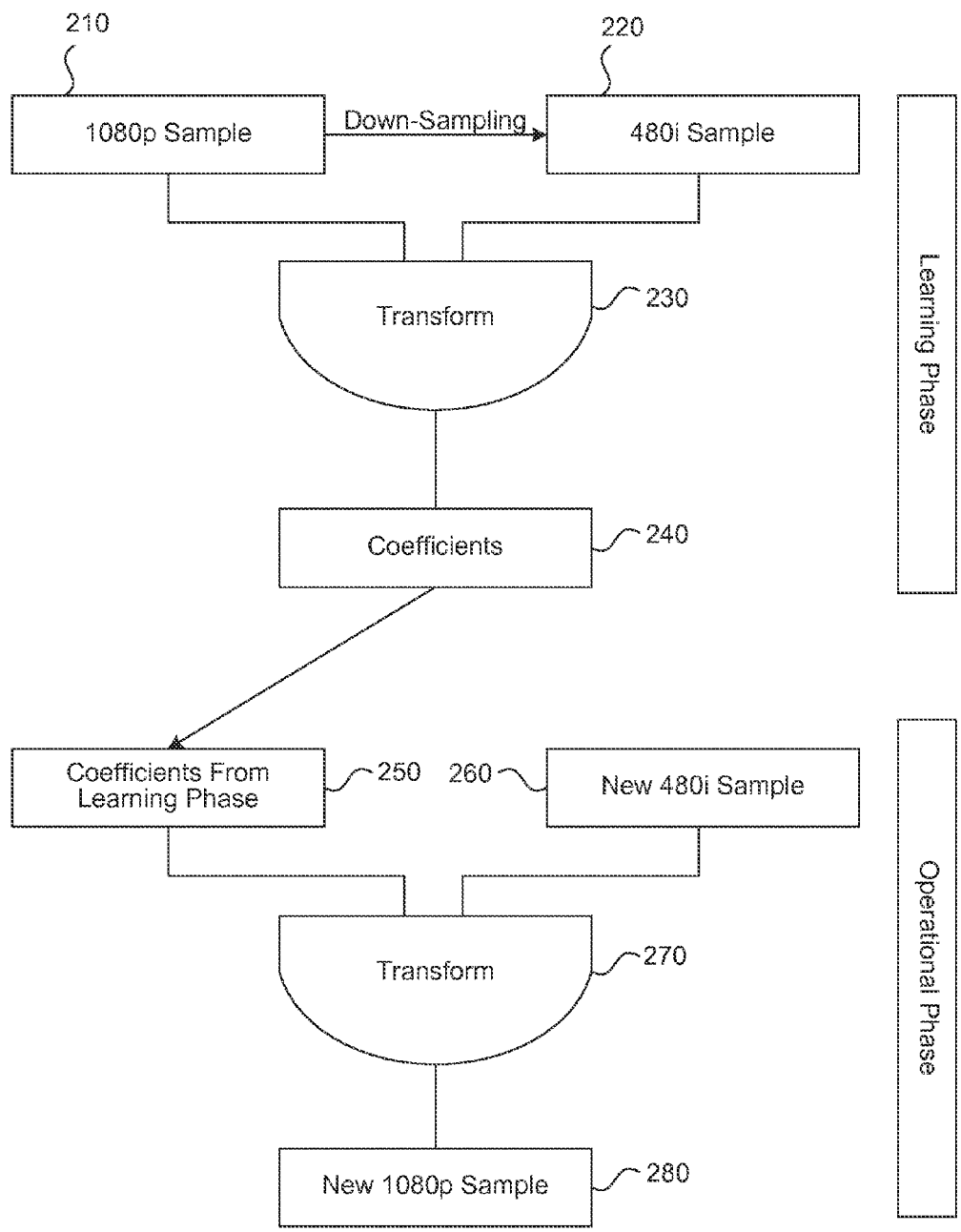
FIG. 2 illustrates an exemplary process of defining optimal coefficients in a learning phase and applying the coefficients to a new sample in an operational phase according to the present invention.

In an illustrative example, a known high resolution progressive scan television sample is utilized in the learning phase and determines the best coefficients to be used in an operational phase for deinterlacing a low resolution interlaced television signal. According to FIG. 2, a known high resolution progressive scan television signal (1080p) sample 210 is provided in a learning phase. The 1080p sample 210 is down-sampled to a low resolution interlaced (480i) target sample 220. Knowing that a transform comprising a combination of deinterlacing and resolution enhancing functions must be performed to reconstruct the 1080p sample 210 from the 480i sample, the known values of the 1080i sample 210 and the 480i sample are applied to the transform 230 to determine optimal coefficients 240 for the transform 230.

Once the learning phase finds the optimal coefficients 240 they are used in the operational phase. A new low resolution interlaced sample (New 480i) 260 and the optimal coefficients 250 are applied to the transform 270. The transform 270 is the same set of deinterlacing and resolution enhancing functions as transform 230. Therefore, the resultant output of the transform 230 is a new high resolution progressive scan television signal (New 1080p) 280 representative of the original 1080p sample.

System for Processing

The process of using a training set of data to optimize the filter function to be applied to a target signal may be incorporated within a computing system according to some embodiments of the present invention. The schematic functionality of this apparatus is represented in FIG. 3.

Figure 3:
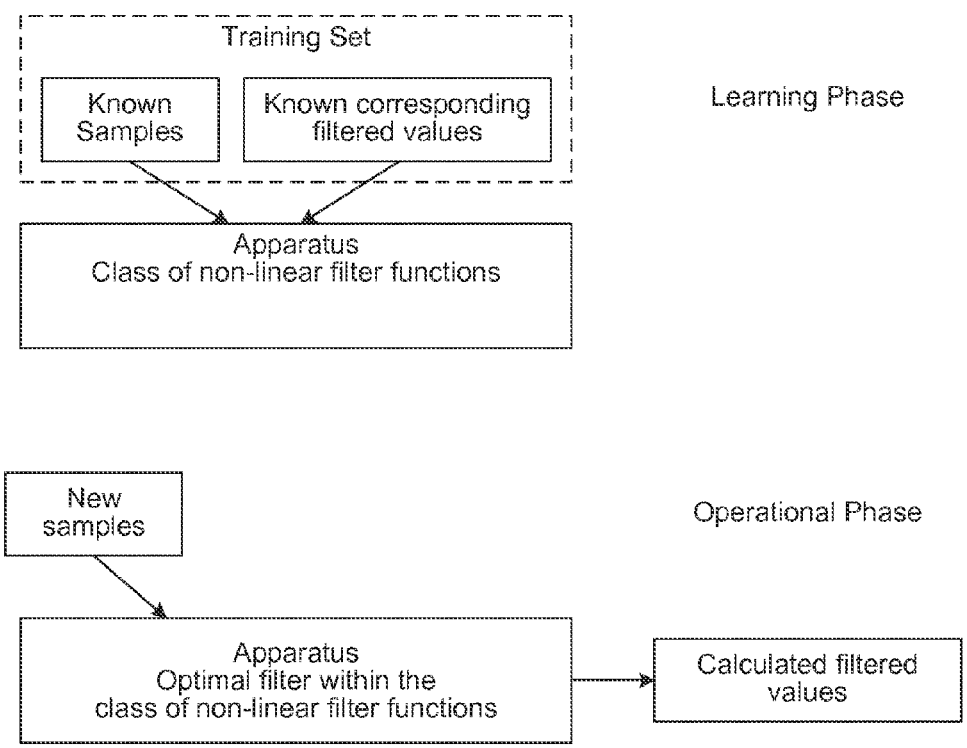
FIG. 3 illustrates the schematic functionality of an apparatus for defining optimal coefficients in a learning phase and applying the coefficients to a new sample in an operational phase according to the present invention.
Figure 4:
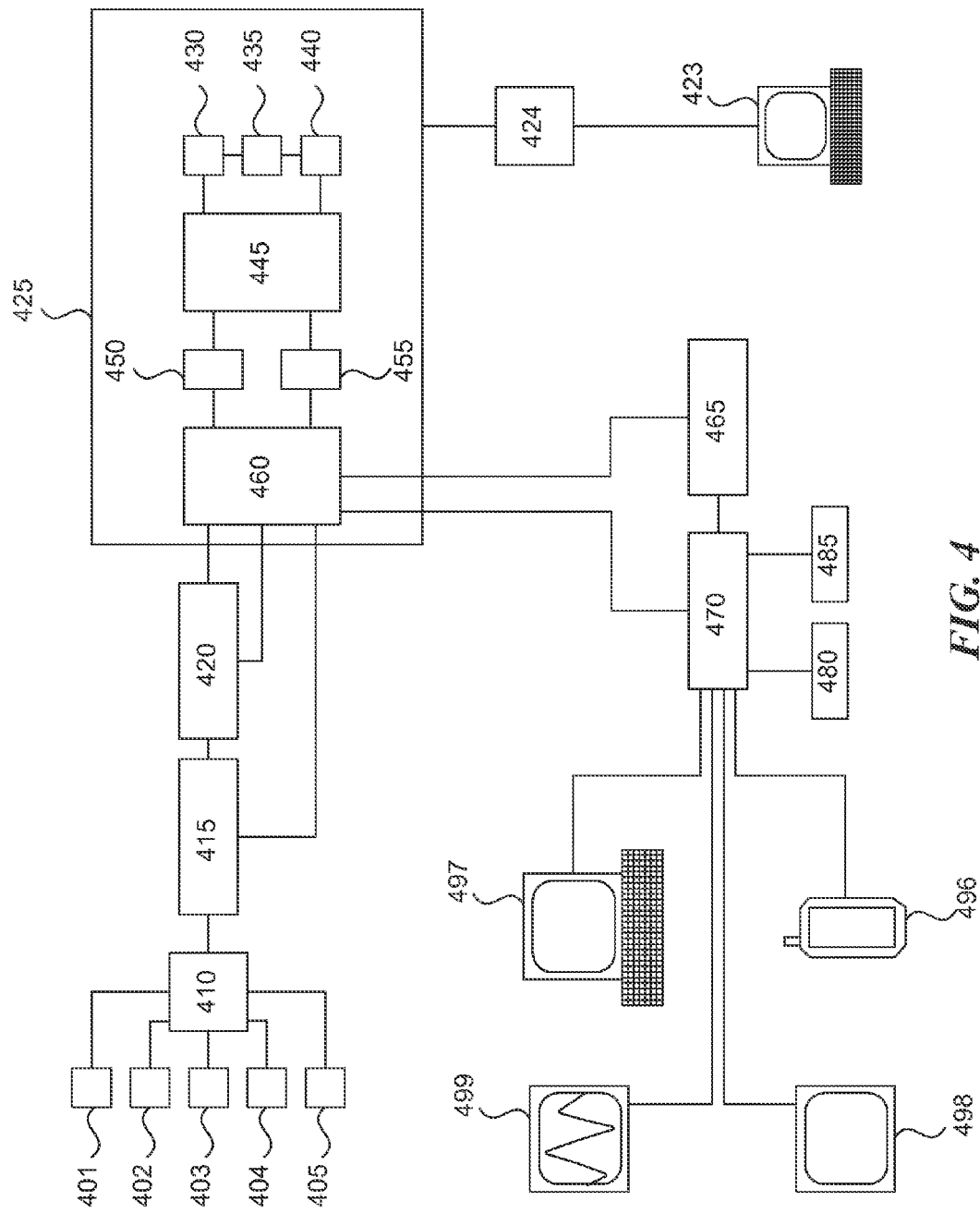
FIG. 4 is a block diagram illustrating the exemplary image enhancement system in accordance with the present invention.

One exemplary apparatus whose functionality is described in FIG. 3 is portrayed in FIG. 4. FIG. 4 is a block diagram illustrating the exemplary image enhancement system 400 in accordance with the present invention. The system 400 is comprised of a content transform apparatus 425 used to transform the content from sources 401, 402, 403, 404 and/or 405 and output a transformed sample. In some embodiments of the present invention, more than one content-type is able to be transformed by the content transform apparatus 425. In some embodiments, content source 401 is a still image capture device, such as a digital camera having a Bayer filter or another appropriate color filter, content source 402 is a digital video capture device, content source 403 is a streaming video source, content source 404 is a computer-generated video source and content source 405 is 3-dimensional medical imaging device such as a MRI device. It will be readily apparent to those having ordinary skill in the art that, although specific examples of signal sources are given, any appropriate signal source, now known or later developed, may similarly be processed by the content transform apparatus 425 of the present invention.

In some embodiments of the present invention, content from the content sources 401, 402, 403, 404 and/or 405 is gathered by the raw data collector 410. Also, in some embodiments, the data is stored in a pre-processing memory device 415. Furthermore, a pre-processor 420 is utilized in some embodiments of the present invention to conduct preliminary processing on data from the content sources 401, 402, 403, 404 and/or 405. In some embodiments of the present invention, the preliminary processing includes performing an anti-aliasing step on the data. In some embodiments, pre-processing compression or decompression is performed on the data in the pre-processor. In yet other embodiments of the present invention, multiple pre-processing steps are conducted on the signal data in the pre-processor 420. Furthermore, although specific examples of pre-processing are disclosed, it will be readily apparent to those having ordinary skill in the art that any appropriate pre-processing function, now known or later developed, may be accomplished by the pre-processor 420.

In some embodiments of the present invention, the content transform apparatus 425 includes: a known sample memory 430, a down-sampling processor 435, a target sample memory 440 and a learning phase processor 445. According to the method described above, known samples from the known sample memory 430 are down-sampled with the down-sampling processor 435, resulting in target samples, which are stored in the target sample memory 440. Known samples and target samples are accessed from the known sample memory 430 and the target sample memory, respectively by the learning phase processor 445. Likewise, transforms are loaded into the learning phase processor 445 from the transform memory 450 and a learning phase step is performed, resulting in known optimal coefficient values. The known optimal coefficient values are stored in a coefficient memory 455.

Preferably, the actions performed by the content transform apparatus 425 are controlled by a controller 424. In some embodiments of the present invention, the controller 424 is coupled to a user interface 423.

Upon determining optimal coefficient values in the learning phase, the operational phase processor 460 loads the same transforms form the learning phase from the transform memory 450, as well as the coefficients from the coefficient memory 455. Furthermore, content data is delivered to the operational phase processor 460 from one or more content source 401, from the raw data collector 410, from the pre-processing memory device 415 and/or the pre-processor 420. Upon loading, an operational phase transform is performed, resulting in transformed output data representative of the known samples.

In some embodiments of the present invention, at least one non-linear filter function is used during the learning phase and the operational phase. In the preferred embodiment of the present invention, learning phase and the operational phase utilize the transform described in the exemplary embodiment from above, as defined by equations (1)-(9).

In some embodiments of the present invention, the transformed output data is directly outputted to output 470. In other embodiments, a post-processor 465 is provided to perform ancillary processing on the enhanced signal data. Once outputted, the transformed output data is stored in an output memory 480 or sent directly to output devices 496, 497, 498 and/or 499, or both. According to some embodiments, output device 496 is a personal data assistant (PDA) or Smartphone (such as a Blackberry™ device manufactured by RIM® or the iPhone™ manufactured by Apple®), output device 497 is a computer or television monitor, output device 498 is a medical apparatus imaging device, and output 499 is a streaming video signal available over a computer network, such as the internet. Although specific examples of output devices are disclosed, it will be readily apparent to those having ordinary skill in the art that any appropriate output device, now known or later developed, is envisioned for use as an output device according to the present invention. In some embodiments, the enhanced signal is outputted to an additional peripheral device 485.

"Reslet" Transformations

In some embodiments of the present invention, a "reslet" transformation is utilized for content enhancement. The effectiveness of wavelet based compression methods currently used take advantage of the fact that a subsampled image (using a low-pass filter) can be reconstructed to an image of the original resolution with an appropriate inverse filter; and the difference from this approximation is equivalent of a high-pass filter; from the combination of the two datasets the original image can be properly reconstructed. The difference tends to be minimal for the majority of the samples, which decorrelates the image well, making this transformation a good candidate for image compression. This view however forecasts that better methods that approximate the original image from the subsampled version will produce better compression results. According to some embodiments of the present invention, a resolution enhancement technique is disclosed that can produce a good approximation of the original image from a subsampled set (by a 2× factor in both dimensions).

Figure 5:
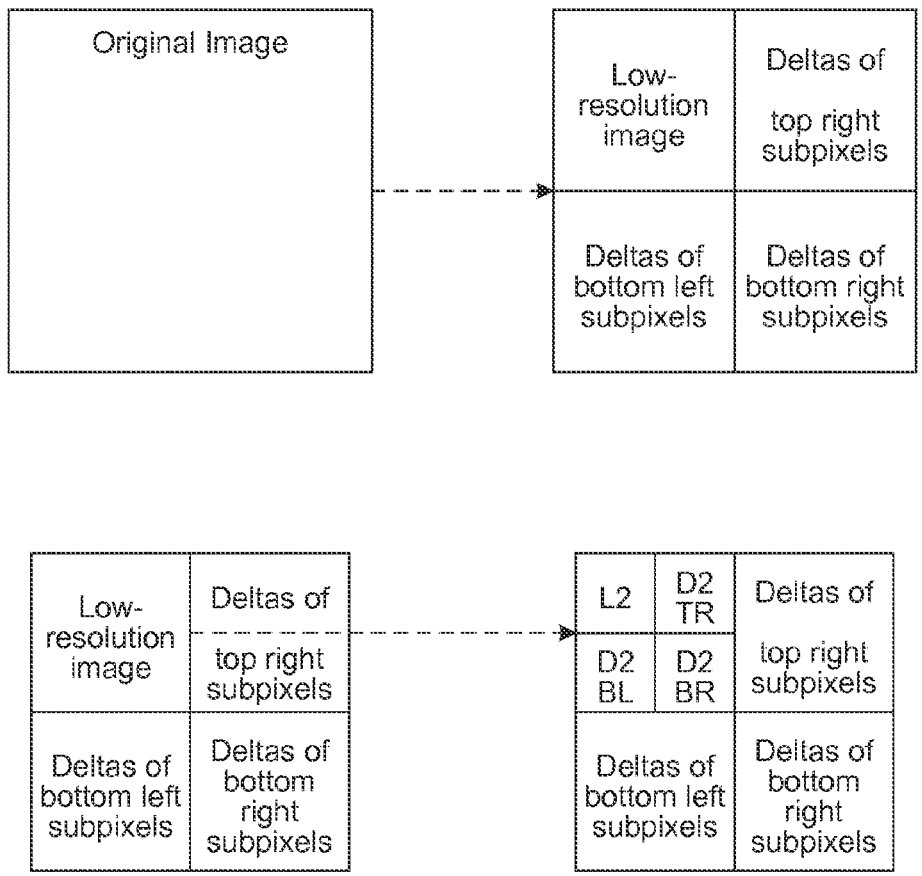
FIG. 5 illustrates a schematic representation a "reslet" transform technique in accordance with some embodiments the present invention.

FIG. 5 illustrates a schematic representation a "reslet" transform technique. Given a resolution enhancement technique that can produce a good approximation of the original image from a subsampled set (by a 2× factor, in both dimensions) one step of the transform is the following:

The top left quarter of the image becomes the subsampled image using the "box convolution kernel", that is each pixel is obtained by the average or the sum of the 2×2 original pixels of the high-resolution image.

The top right corner is obtained by the "delta", the difference between the original top right pixel of each corresponding low-res pixel, and the approximation by the resolution enhancement filter. Similarly, the bottom left and bottom right pixels are the error of the approximation method for the corresponding subpixels.

Then, similarly to a Wavelet transform, the top left subsampled image is recursively transformed again and again for a preset number of iterations or until a preset threshold size is reached.

For the inverse transformation in each step the large image is approximated from the top left subsampled image; then the delta is applied for the top right, bottom left and bottom right subpixels. There is no "delta" for the top left subpixel, but at the last step, as the sum of the 4 pixels should be equal to 4× the subsampled pixel, the top left pixel value should be adjusted accordingly. This will fully restore the original image without rounding errors.

The wavelet transformation of any wavelet-based compression methods can be replaced by the above defined "reslet" transformation, and therefore any known compression method can be used.

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications can be made in the embodiment chosen for illustration without departing from the spirit and scope of the invention. Specifically, it will be apparent to one of ordinary skill in the art that the device and method of the present invention could be implemented in several different ways and have several different appearances.

The invention claimed is:

1. A system for transforming content data comprising:
at least one content data source;
an image processing apparatus comprising:
transform memory containing a set of at least one pre-selected filter function weighted with at least one coefficient;
a known data memory containing at least one known content sample;
a target sample memory;
a down-sampling processor, wherein the down-sampling processor obtains a known content sample from the known data memory and performs a down-sampling transform, resulting in a target sample;
a target sample memory;
a learning phase processor, wherein the learning phase processor obtains a known content sample, at least one pre-selected filter function, and a target sample, and wherein the learning phase processor determines the best coefficients for transforming the target sample to the known content sample, resulting in at least one optimal coefficient; and
an operational phase processor, wherein the operational phase processor obtains at least one preselected filter function, at least one optimal coefficient and content data from the at least one content data source, and wherein the content data is transformed using the at least one filter function and the at least one optimal coefficient, resulting in transformed content data; and
an output.

2. The system for transforming content data according to claim 1, wherein the at least one pre-selected filter function comprises a linear combination of pre-selected non-linear functions.

3. The system for transforming content data according to claim 1, wherein at least one content data source is selected from among: image-capture devices, scanners, video capture devices, medical imaging devices, streaming video sources, and generated video sources.

4. The system for transforming content data according to claim 1, wherein the image processing apparatus is incorporated into a television cable modem, wherein the at least one content source is a low resolution television signal, wherein the set of at least one pre-selected filter function comprises at least partially a resolution enhancement function, and
wherein the output is a high resolution television signal.

5. The system for transforming content data according to claim 4, wherein the low-resolution television signal comprises a low resolution interlaced television signal, wherein the set of at least one pre-selected filter function comprises at least partially a de-interlacing function, and wherein the output is a high resolution progressive scan television signal.

* * * * *